Dec. 17, 1929.   W. W. WOOD   1,740,278
WINDOW GLASS
Filed Oct. 14, 1927
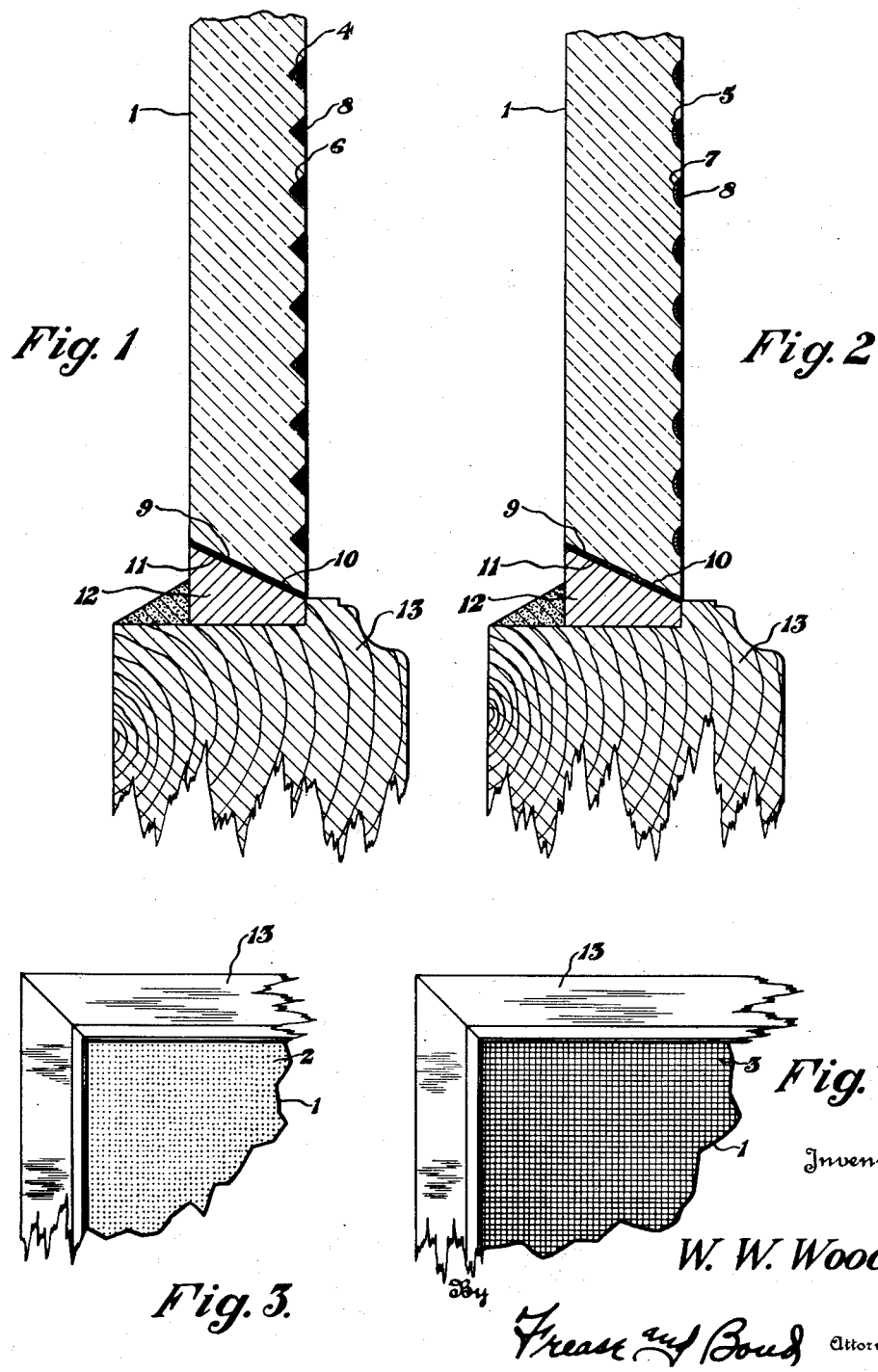

Patented Dec. 17, 1929

1,740,278

UNITED STATES PATENT OFFICE

WALTER W. WOOD, OF CANTON, OHIO

WINDOW GLASS

Application filed October 14, 1927. Serial No. 226,166.

The invention relates to window glass and more particularly a glass designed for permitting free vision through the same from one side only.

The object of the improvement is to provide a window pane and the like having reflecting media upon the inner surface thereof whereby a person upon the inside of the room or building or vehicle may have virtually unobstructed vision through the glass while at the same time, the reflecting media prevents a person upon the outside from looking through the glass to see the interior of the room or building.

A further object is to provide means upon the glass whereby when the room is illuminated at night, vision through the glass from the outside is prevented or obstructed.

The above and other objects may be attained by providing spaced angular, or concaved depressions or grooves upon the inner surface of the glass, said depressions or grooves being coated with a suitable mirror backing and so spaced apart that vision through the glass from the inside is not materially obstructed, while the reflections from said mirror surfaces toward the outside will prevent anyone upon the outside of the room or building from seeing through the glass.

Means are also provided for preventing the interior of a lighted room from being seen from the outside, said means comprising angularly disposed mirror surfaces around the edges of the glass pane for reflecting the light from the inside of the room through the glass and preventing vision therethrough from the exterior.

An embodiment of the invention is illustrated in the accompanying drawing, in which—

Figure 1 is an enlarged transverse sectional view through a portion of a pane of the improved glass showing spaced angular mirror surfaced depressions or grooves upon the inner surfaces of the glass;

Fig. 2 a similar view showing concaved mirror surfaced depressions or grooves;

Fig. 3 a fragmentary elevation of the inside of a portion of the glass provided with the spaced depressions and Fig. 4 a similar view showing the glass provided with the spaced intersecting grooves.

Similar numerals refer to similar parts throughout the drawing.

The glass pane 1 may be provided with spaced depressions as shown at 2 in Fig. 3 or grooves as shown at 3 in Fig. 4.

As shown on an enlarged scale in Figs. 1 and 2, these depressions or ridges may be of angular shape as shown at 4 in Fig 1 or may be concaved as shown at 5 in Fig. 2.

Either the depressions or the grooves are preferably spaced apart substantially the distance shown in the drawing, in which the distance from center to center of the depressions or grooves is substantially three times the diameter or width of a depression or groove.

The depressions or grooves are provided with mirror surfaces facing the surfaces of the depressions or grooves as indicated at 6 and 7 in Figs. 1 and 2, which may be of any suitable and well known construction and are preferably backed with any usual material, as indicated at 8 in said figures.

Where the grooves are used, as shown in Fig. 4, these grooves are preferably located in spaced horizontal and vertical rows. If desired, the impressions may be formed upon the inner surface of the glass pane, while sufficiently heated, by pressing a sheet of wire mesh against the inner surface of the hot glass pane.

It should be understood that as soon as the depressions are formed in the glass the wire mesh is immediately removed and the depressions are coated with the mirror surface as above described.

With such a construction of window pane, it has been found that the minute depressions or grooves, which in actual practice need not exceed a sixty-fourth of an inch in diameter or width, do not obstruct the vision from the inside of the room or building in which the glass is used and at a distance of a few feet are barely perceptible.

At the same time the light from the outside striking the angular or curved mirror surfaces reflects light back through the glass in all directions, absolutely preventing a person upon the outside from seeing through the glass and into the interior of the room or building.

For the purpose of preventing a person from seeing into a lighted room at night, the edges of the window pane may be beveled outward as indicated at 9 in Figs. 1 and 2, these beveled edges being provided with mirror surfaces indicated at 10, and having a suitable backing as shown at 11.

Any suitable form of frame as shown at 12 may be provided around the beveled edges of the window pane for inserting the same into the usual form of window sash indicated at 13.

This beveled mirror edge around the entire window pane receives the light from the interior of the lighted room and reflects the same substantially in the normal plane of the glass, preventing a person upon the outside from seeing through the glass and into the lighted room.

From the above it will be obvious that a glass is provided which permits unobstructed view through the same from the interior of a room or house or vehicle while at the same time the reflection of the light from the reflecting media prevents vision through the glass from the outside.

It will also be seen that the beveled mirror edges upon the glass will so reflect the light from a lighted room that the glass cannot be seen through from the outside.

If desired, an electric lamp or the like may be placed just above the window on the outside thereof in order that the light rays striking the beveled mirror edges of the glass pane will be so reflected as to assist in preventing vision through the glass from the outside.

I claim:

1. A pane of glass having spaced depressions in one surface, the spaces between said depressions being greater than the widths of the depressions, and mirror surfaces in said depressions facing the surfaces of the depressions whereby reflections of light from said mirror surfaces will prevent vision through the glass from the opposite side.

2. A pane of glass having spaced depressions in one surface and mirror surfaces in said depressions facing the surfaces of the depressions and beveled, mirror surfaced edges around said pane of glass whereby reflections of light from all of said mirror surfaces will prevent vision through the glass from the opposite side.

3. A pane of glass having spaced grooves in one surface, the spaces between said grooves being greater than the widths of the grooves, and mirror surfaces in said grooves facing the surfaces of the grooves, whereby reflections of light from said mirror surfaces will prevent vision through the glass from the opposite side.

4. A pane of glass having spaced grooves in one surface and mirror surfaces in said grooves facing the surfaces of the grooves and beveled mirror surfaced edges around said pane of glass, whereby reflections of light from all of said mirror surfaces will prevent vision through the glass from the opposite side.

5. A pane of glass having spaced, intersecting grooves in one surface and mirror surfaces in said grooves facing the surfaces of the grooves, whereby reflections of light from said mirror surfaces will prevent vision through the glass from the opposite side.

6. A pane of glass having spaced rows of vertical and horizontal grooves in one surface and mirror surfaces in said grooves facing the surfaces of the grooves, whereby reflections of light from said mirror surfaces will prevent vision through the glass from the opposite side.

7. A pane of glass having spaced rows of angularly disposed grooves in one surface, and mirror surfaces in said grooves facing the surfaces of the grooves, whereby reflections of light from said mirror surfaces will prevent vision through the glass from the opposite side.

8. A pane of glass having spaced, intersecting grooves in one surfaces, the spaces between said grooves being greater than the widths of the grooves, and mirror surfaces in said grooves facing the surfaces of the grooves, whereby reflections of light from said mirror surfaces will prevent vision through the glass from the opposite side.

9. A pane of glass having concave depressions in one surface, flat surfaces between the depressions, and mirror surfaces in said depressions only facing the surfaces of the depressions, whereby reflections of light from said mirror surfaces will prevent vision through the glass from the opposite side, and permit vision through the glass from the depression side.

10. A pane of glass having concave grooves in one surface, flat surfaces between the grooves, and mirror surfaces in said grooves only facing the surfaces of the grooves, whereby reflections of light from said mirror surfaces will prevent vision through the glass from the opposite side and permit vision through the glass from the grooved side.

In testimony that I claim the above, I have hereunto subscribed my name.

WALTER W. WOOD.